United States Patent
Valio et al.

(10) Patent No.: US 7,359,429 B2
(45) Date of Patent: Apr. 15, 2008

(54) SUPPORT OF THE DETERMINATION OF A CORRELATION

(75) Inventors: Harri Valio, Kämmenniemi (FI); Samuli Pietilä, Tampere (FI)

(73) Assignee: Nokia Corporation, Espoo (FI)

( * ) Notice: Subject to any disclaimer, the term of this patent is extended or adjusted under 35 U.S.C. 154(b) by 705 days.

(21) Appl. No.: 10/828,537

(22) Filed: Apr. 19, 2004

(65) Prior Publication Data

US 2005/0232380 A1 Oct. 20, 2005

(51) Int. Cl.
*H04L 27/30* (2006.01)

(52) U.S. Cl. ............ 375/142; 375/149; 375/152; 375/355; 370/503

(58) Field of Classification Search ......... 375/142, 375/143, 150, 152, 149, 354, 355, 362, 367, 375/372; 327/141, 144, 145; 370/503, 515; 711/100, 154, 155, 163, 141

See application file for complete search history.

(56) References Cited

U.S. PATENT DOCUMENTS

| 5,329,549 | A | * | 7/1994 | Kawasaki | 375/150 |
| 6,028,883 | A | * | 2/2000 | Tiemann et al. | 375/150 |
| 6,643,678 | B2 | * | 11/2003 | Van Wechel et al. | 708/530 |
| 6,888,879 | B1 | * | 5/2005 | Lennen | 375/149 |
| 7,061,972 | B1 | * | 6/2006 | Best | 375/150 |

* cited by examiner

*Primary Examiner*—Dac V. Ha

(57) ABSTRACT

A method for supporting a determination of the correlation between at least one received code modulated signal and at least one available replica code is shown. In order to reduce the total memory size required for such correlations, the method comprises storing signal samples of the at least one received code modulated signal with a first rate in a memory. The stored signal samples are then read with a second rate from the memory for determining a correlation between the read signal samples and samples of the at least one available replica code, wherein the second rate is higher than said first rate. The disclosure relates equally to a corresponding electronic device, to a chip for such an electronic device, to a system comprising such an electronic device and to a corresponding software product.

22 Claims, 6 Drawing Sheets

|  | Prior art GPS C/A receiver | Proposed C/A receiver (*) |
|---|---|---|
| Sample Rate [MHz] | 2 | 2 |
| A/D wordlength (complex) [bits] | 3 | 3 |
| Correlators (complex) | 8184 | 8184 |
| DFT bins | 17 | 1 |
| Coherent integration length [ms] | 20 | 20 |
| Coherent memory wordlength (complex) [bits] | 8 | 8 |
| Coherent + QuickShot memory [kBytes] | 272 | 75 |

* Calculated with 2X coherent integration length and 1 DFT bin, number of DFT bins in non-coherent integration is not limited

Fig. 5

SUPPORT OF THE DETERMINATION OF A CORRELATION

FIELD OF THE INVENTION

The invention relates to a method for supporting the determination of the correlation between at least one received code modulated signal and at least one available replica code. The invention relates equally to a corresponding electronic device, to a chip for such an electronic device, to a system comprising such an electronic device and to a corresponding software product.

BACKGROUND OF THE INVENTION

The correlation between a received code modulated signal and an available replica code has to be acquired for example in CDMA (Code Division Multiple Access) spread spectrum communications.

For a spread spectrum communication in its basic form, a data sequence is used by a transmitting unit to modulate a sinusoidal carrier and then the bandwidth of the resulting signal is spread to a much larger value. For spreading the bandwidth, the single-frequency carrier can be multiplied for example by a high-rate binary pseudo-random noise (PRN) code sequence comprising values of −1 and 1, which code sequence is known to a receiver. Thus, the signal that is transmitted includes a data component, a PRN component, and a sinusoidal carrier component. A PRN code period comprises typically 1023 chips, the term chips being used to designate the bits of the code conveyed by the transmitted signal, as opposed to the bits of the data sequence.

A well known system which is based on the evaluation of such code modulated signals is GPS (Global Positioning System). In GPS, code modulated signals are transmitted by several satellites that orbit the earth and received by GPS receivers of which the current position is to be determined. Each of the satellites transmits two microwave carrier signals. One of these carrier signals L1 is employed for carrying a navigation message and code signals of a standard positioning service (SPS). The L1 carrier signal is modulated by each satellite with a different C/A (Coarse Acquisition) Code known at the receivers. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with the navigation information at a bit rate of 50 bit/s. The navigation information, which constitutes a data sequence, can be evaluated for example for determining the position of the respective receiver.

A receiver receiving a code modulated signal has to have access to a synchronized replica of the employed modulation code, in order to be able to de-spread the data sequence of the signal. More specifically, a synchronization has to be performed between the received code modulated signal and an available replica code. Usually, an initial synchronization called acquisition is followed by a fine synchronization called tracking. In both synchronization scenarios, correlators are used to find the best match between the replica code sequence and the received signal and thus to find their relative shift called code phase. The match can be determined for example with chip accuracy. If an accuracy of a fraction of a chip is needed, the chip can be presented by several samples after an analog-to-digital conversion.

During the acquisition, the phase of the received signal relative to the available replica code sequence can have any possible value due to uncertainties in the position of the satellite and the time of transmission of the received signal.

Moreover, an additional frequency modulation of the received signal may occur, which can be as large as +/−6 kHz, for example due to a Doppler effect and/or a receiver clock inaccuracy. The search of the code phase is therefore usually performed with different assumptions on an additional frequency modulation. For a sensitivity increase, in particular for weak signal environments like indoor environments, a receiver normally uses long integrations that require the frequency uncertainty to be as small as a few Hz. Therefore, even with the aligned code, a large number of frequency assumptions should be checked.

The initial acquisition is thus a two-dimensional search in code phase and frequency. Many different parallel architectures, time multiplexing and off-line processing approaches have been presented so far for the acquisition of received code modulated signals. To meet the real time processing and weak signal sensitivity requirements, usually, a massive correlator bank which is able to check in parallel hundreds and thousands of options is employed for implementing the acquisition stage of a receiver.

Each correlator of such a massive correlator bank checks simultaneously another option defined by a specific code phase and a specific frequency of modulation. To this end, each correlator multiplies a received code modulated signal to a predetermined compensating sinusoidal signal, aligns the compensated code modulated signal with the replica code sequence at a predetermined code-phase, multiplies the samples of the compensated code modulated signal and the samples of the replica code sequence element by element and integrates the multiplication results. The integration can be either purely coherent or include a non-coherent stage. In a non-coherent stage, consecutive coherent integration results for a certain number of multiplication results, respectively, are further integrated by summing the absolute or the squared values of these integration results.

If the assumptions on the code-phase and the frequency modulation belonging to one option are correct for the received code modulated signal, then the correlation results in a larger integration value than in the case of a misalignment or an inappropriate compensation of a frequency modulation. Thus, detecting the correlation peak and comparing it with a certain threshold allows finding the correct code phase and the correct frequency of modulation.

For illustration, FIG. 6 presents a schematic block diagram of an acquisition and tracking portion of a conventional receiver.

In the receiver, received samples are mixed by a mixer 62 with various search center frequencies $e^{j\omega t}$. The mixed samples are then decimated by a decimation block 63 in accordance with a provided code frequency. The mixed and decimated samples are provided to a matched filter 64 to find out the code phase, or delay, of the received signal compared to an available replica code sequence.

The output of the matched filter 64 for a respective checked code phase is provided to a Discrete Fourier Transform (DFT) bank 65 to determine in addition the Doppler frequency in the received signal. The DFT bank 65 mixes to this end the respective output of the matched filter 64 in parallel with a plurality of possible Doppler frequencies $e^{j\omega_1 t}$, $e^{j\omega_2 t}$, etc., $e^{-j\omega_1 t}$, $e^{-j\omega_2 t}$, etc. The results for each possible Doppler frequency are added to a coherent memory 66. The coherent memory 66 is structured in the form of a table which comprises one column for each delay checked by the matched filter 64, and one row for each DFT bin.

A processing component 67 then forms the sum over the squared I and Q components for each entry in the coherent memory 66 as a coherent addition.

The output of the processing portion 67 is stored in a non-coherent memory 68 for a subsequent non-coherent integration. The non-coherent memory 68 is structured in the same way as the coherent memory 66.

While the first hand-held GPS receivers were using less than 12 correlators, modern GPS receivers use up to 16 000 correlators. A higher number of correlators obviously requires a larger silicon area of the integrated circuit (IC) chip on which the correlators are implemented. Currently, a long stream of multiplication results is digitized and stored in a coherent memory for assembling data for a respective off-line coherent integration, and the coherent integration results are stored in a non-coherent memory for subsequent off-line non-coherent integrations. In new assisted GPS receivers, coherent and non-coherent integration memories for up to hundreds of kBytes occupy most of the silicon area. Roughly, ½ to ⅔ of this memory space belongs to the coherent integration memory.

It has to be noted that a similar problem may occur with any other receiver of code modulated signals, in particular with any other Global Navigation Satellite System (GNSS), like the European satellite navigation system Galileo or Glonass.

SUMMARY OF THE INVENTION

A method for supporting the determination of the correlation between at least one received code modulated signal and at least one available replica code is proposed. The method comprising storing signal samples of the at least one received code modulated signal with a first rate in a memory. The method further comprises reading stored signal samples with a second rate from the memory for determining a correlation between the read signal samples and samples of the at least one available replica code, wherein the second rate is higher than the first rate.

Moreover, an electronic device and a chip for an electronic device are proposed. The proposed electronic device and the proposed chip both comprise a memory adapted to store with a first rate signal samples of at least one code modulated signal received by an electronic device. Further, the proposed electronic device and the proposed chip both comprise a correlation component adapted to read signal samples stored in the memory with a second rate, which second rate is higher than the first rate. The correlation component is adapted in addition to determine a correlation between the read signal samples and samples of a replica code. The electronic device can be for example a mobile terminal. The chip can be for example a baseband application specific integrated circuit (ASIC). The chip can be for instance inserted into an electronic device. Optionally, the chip may be removable so that it can be inserted subsequently into different devices or units.

Moreover, a system is proposed, which comprises the proposed electronic device and in addition at least one network element of a communication network. The network element may provide the electronic device with assistance data or perform processing operations of which the results are required at the electronic device. The system may comprise in addition at least one beacon transmitting a code modulated signal which can be received by the electronic device. Such a beacon can be for instance a satellite of a satellite based positioning system.

Finally, a software program product is proposed, in which a software code for supporting the determination of the correlation between at least one received code modulated signal and at least one available replica code is stored. When running in a processing unit, the software code causes signal samples of at least one received code modulated signal to be stored with a first rate in a memory. The software code further causes signal samples stored in the memory to be read from the memory with a second rate for determining a correlation between the read signal samples and samples of the at least one available replica code, wherein the second rate is higher than the first rate.

The invention proceeds from the consideration that for coherent integrations, data for each received code modulated signal has to be stored only once, not separately for various replica codes, code phases and various frequency modulations, if samples of a received code modulated signal are stored in a memory before they are provided to the correlation processing. The samples can then be retrieved from the memory at a higher rate than the rate at which they are written to the memory, and thus be processed quasi on-line in the correlation processing, in particular in a respective coherent integration.

It is an advantage of the invention that it enables a reduction of the required memory space. The required memory space is also reduced since the wordlength in the memory storing samples of a received signal is smaller than in the coherent memory. The coherent memory can be reduced for example by 70%, and the silicon area required for the coherent memory will be only ⅖/₁₅ of the entire memory silicon area instead of ⅘. As a result, the silicon area of an IC may be decreased by 30% compared to a conventional IC in which ⅔ of the silicon area is occupied by memory, of which in turn ⅔ is provided as a memory for coherent integrations.

The memory storing samples of a received signal can be for example a sample memory, and it may comprise for example samples for all received code modulated signals at all frequencies.

In one embodiment of the invention, the signal samples are read from the memory storing samples of a received signal only when signal samples for at least one integration period of a coherent integration employed in the scope of a correlation have been stored in the memory.

In a further embodiment of the invention, determining the correlation comprises compensating in the extracted samples sequentially various possible Doppler frequencies and applying sequentially for each of these possible Doppler frequencies a matched filter operation to the compensated samples. The matched filter operation can be used in particular for comparing the received, compensated samples with an available replica code sequence for different relative shifts between the received samples and the available replica code sequence.

The results of the matched filter operation can further be subjected to a coherent integration and/or a non-coherent integration.

The invention may be employed for any receiver of code modulated signals, for example for a Global Navigation Satellite System (GNSS) receiver, like a GPS receiver, a Galileo receiver or a Glonass receiver.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 5 is a table comparing conventional receivers with receivers according to the invention.

DETAILED DESCRIPTION OF THE INVENTION

Figure 1:
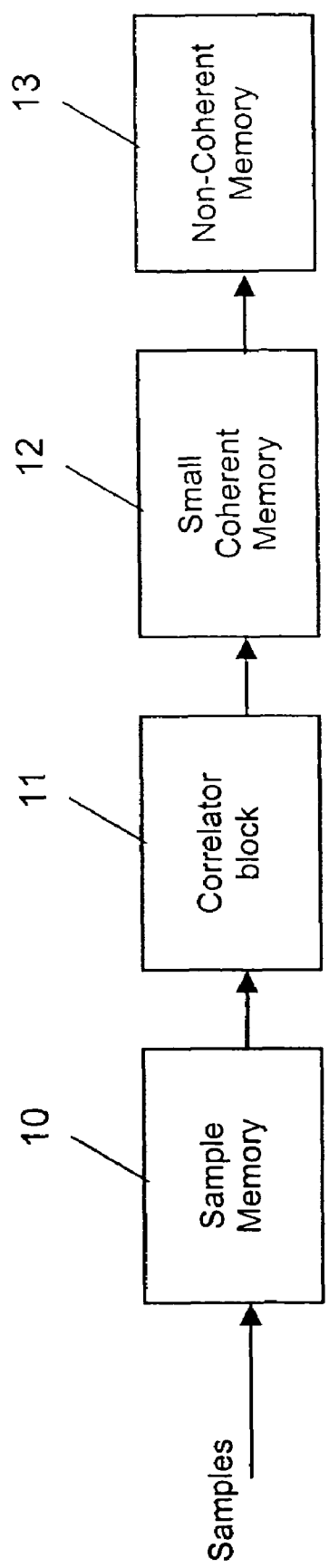
FIG. 1 is a block diagram illustrating the principle of the invention.

The block diagram of FIG. 1 illustrates the principle of the invention when implemented in a receiver receiving code modulated signals from a plurality of beacons. The received signals are to be associated to and aligned with corresponding replica codes by means of a correlation and at least a coherent integration of the correlation results.

The block diagram comprises a sample memory 10, which is connected to a correlator block 11. The correlator block 11 is connected further to a small coherent memory 12, and the small coherent memory 12 is followed by a non-coherent memory 13.

The sample memory 10 is used as a circular buffer for buffering digitized samples of received code modulated signals. The sample memory 10 is able to buffer samples for the number of beacons from which signals may be received at a maximum at the same time. For each beacon, the sample memory 10 is moreover able to store digitized samples at least for the desired length of the coherent integration and at the most for twice the desired length of the coherent integration. The exact memory size depends on a time multiplexing of the hardware in the receiver.

The correlator block 11 starts to read the samples from the sample memory 10 when at least sufficient samples required for the complete length of the coherent integration have been stored. The correlator block 11 reads the samples from the sample memory 10 with a higher speed than the speed with which incoming samples are provided to the sample memory 10. Reading the samples with a higher data rate than the incoming samples permits reading the same samples various times for checking various replica codes, code phases and frequency modulations without the need to store the same data various times in parallel, and to process the read data nevertheless with the rate of the incoming samples. When the correlator block 11 has processed the read samples over the coherent integration period, the results are added directly to the coherent memory 12. The data in the coherent memory 12 is subjected to a non-coherent integration. Thus, no coherent memory or almost no coherent memory 12 is needed. If an additional coherent integration is required nevertheless, the integration results of the non-coherent integration are stored in the non-coherent memory 13 for such an additional coherent integration.

Compared to a conventional correlation, the hardware does not change significantly. Only the timing when and in which order it is run changes.

Figure 2:
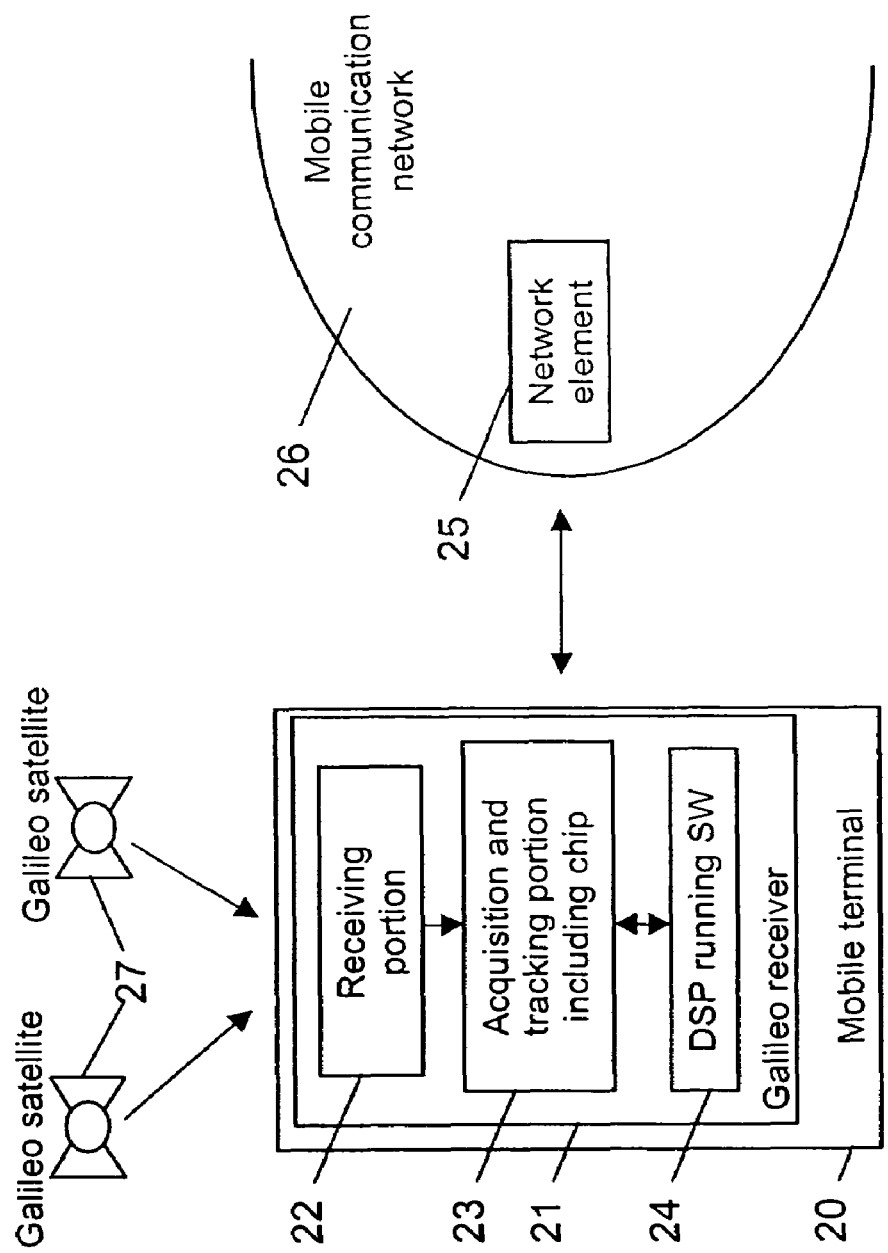
FIG. 2 is a schematic block diagram of a system according to an embodiment of the invention.

In the following, a satellite based positioning system according to an embodiment of the invention will be described in more detail. FIG. 2 schematically presents this satellite based positioning system.

The system comprises a mobile terminal 20 including a Galileo receiver 21, a network element 25 of a mobile communication network 26 and a plurality of Galileo satellites 27. The Galileo receiver 21 includes a receiving portion 22 for receiving code modulated signals from Galileo satellites 27, an acquisition and tracking portion 23 for acquiring and tracking a received code modulated signal, and a digital signal processor (DSP) 24 supporting the acquisition and tracking. The network element 25 provides assistance data to the DSP 24 using a regular radio-based communication between the mobile terminal 20 and the mobile communication network 26. Alternatively or in addition, the network element 25 of the mobile communication network 26 could perform computations for supporting the acquisition and tracking of a code modulated signal received by the Galileo receiver 21 using a regular radio-based communication between the mobile terminal 20 and the mobile communication network 26. The network element 25 can be for example a base station of the mobile communication network 26.

Figure 3:
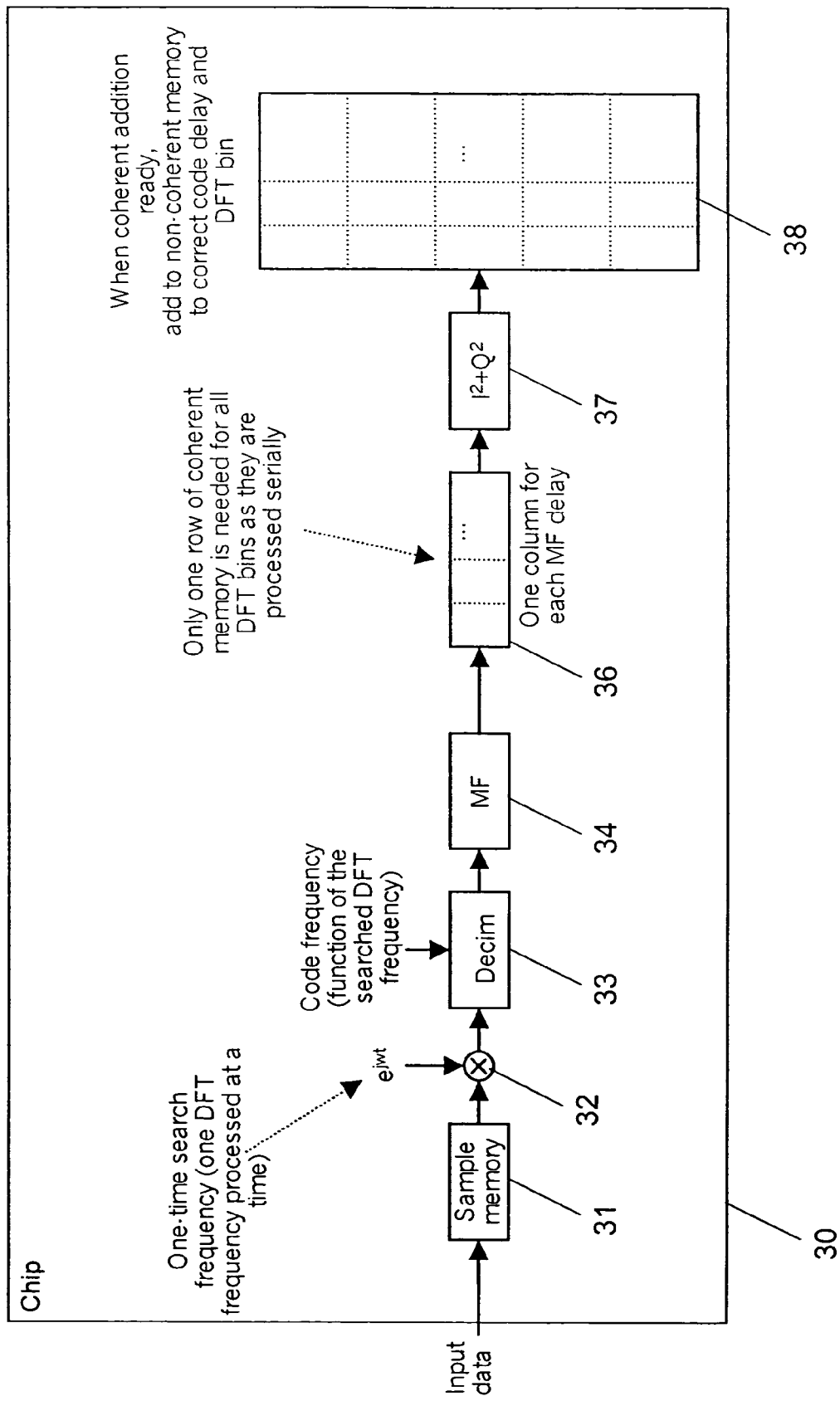
FIG. 3 is a schematic block diagram of a chip according to an embodiment of the invention.

The acquisition and tracking portion 23 of the Galileo receiver 21 may be realized in form of a chip. FIG. 3 presents the general structure of such a chip 30.

The receiving portion 22 is connected within the chip 30 to a sample memory 31. The sample memory 31 is connected via a mixer 32, a decimation block 33 and a matched filter 34 to a small coherent memory 36. The small coherent memory 36 is structured in the form of a table which comprises only a single row. The small coherent memory 36 is further connected via processing component 37 to a non-coherent memory 38. The non-coherent memory 38 is structured in the form of a table which comprises one column for each delay checked by the matched filter 64, and one row for each DFT bin. The operation of the acquisition and tracking portion is illustrated in the flow chart of FIG. 4.

Figure 4:
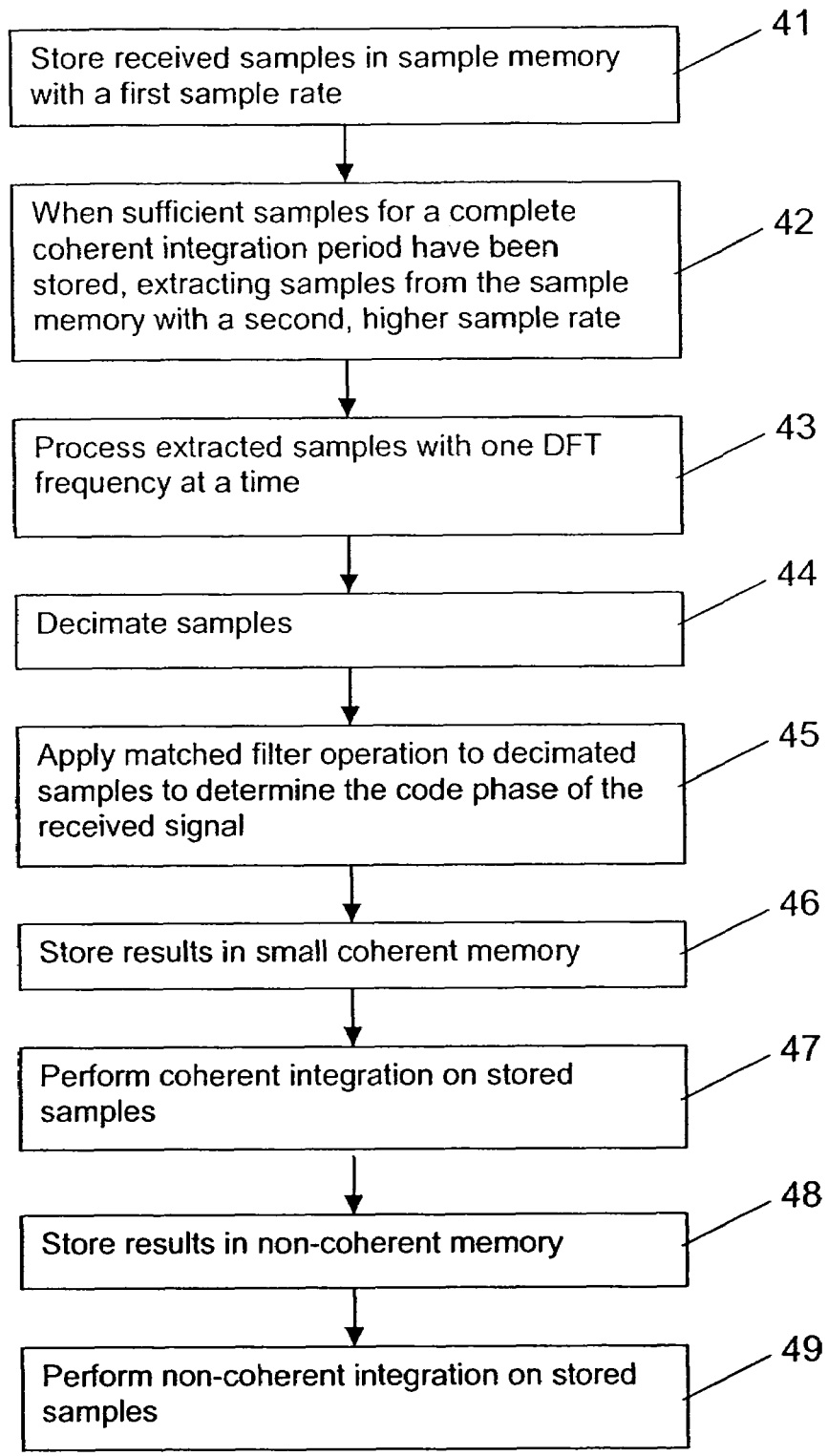
FIG. 4 is a flow chart illustrating the operation of the receiver in FIG. 3.

The received samples provided by the receiving portion 22 are first stored in the sample memory 31 with a first sample rate. This is indicated in FIG. 4 as a step 41. When sufficient samples for a complete coherent integration period have been stored, the samples are extracted from the sample memory 31 with a second, higher sample rate. This is indicated in FIG. 4 as a step 42. The extracted samples are provided to the mixer 32, which applies sequentially different search frequencies $e^{j\omega t}$, in order to process one DFT frequency at a time for checking various possible Doppler frequencies. This is indicated in FIG. 4 as a step 43. The mixed samples are then decimated by the decimation block 33 in accordance with a provided code frequency, which is a function of the respectively searched DFT frequency. This is indicated in FIG. 4 as a step 44.

The decimated signals are provided to the matched filter 34 to determine the code phase of the received signal compared to an available replica code sequence. This is indicated in FIG. 4 as a step 45. The output of the matched filter 34 is provided to the small coherent memory 36, which comprises one entry for each delay checked by the matched filter 34. This is indicated in FIG. 4 as a step 46. The coherent memory 36 does not require a separate row for all DFT bins, like the coherent memory 66 of the conventional receiver of FIG. 6, since the sample memory 31 allows to process the DFT bins serially.

The processing component 37 now forms the sum over the squared I and Q components for each entry in the coherent memory 36, thereby performing a coherent integration. This is indicated in FIG. 4 as a step 47.

The output of the processing portion 37 is stored in the non-coherent memory 38 for use in a subsequent non-coherent integration. This is indicated in FIG. 4 as steps 48 and 49. The non-coherent memory 38 has, like the non-coherent memory 68 of the conventional receiver depicted in FIG. 6, again a separate entry for each combination of the checked delays and the checked DFT bins.

Figure 6:
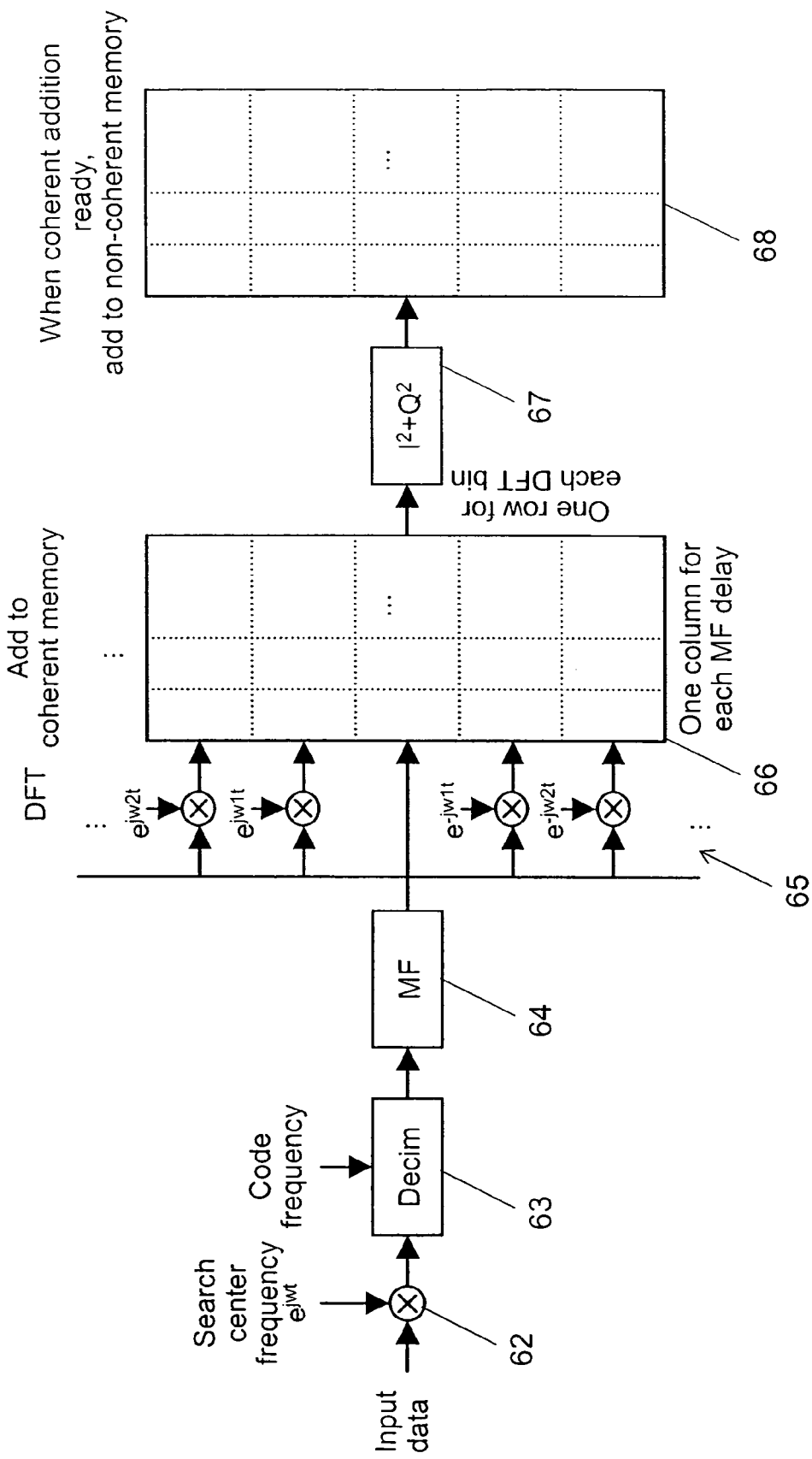
FIG. 6 is a schematic block diagram of a conventional receiver.

Due to the sample memory 31, the processing speed in the mixer 32, the decimation block 33, the matched filter 34, the coherent memory 36, the processing component 37 and the non-coherent memory 38 can thus be increased compared to corresponding components 62, 63, 64, 66, 67 and 68 in the receiver of FIG. 6. As a result, the size of the coherent memory 36 can be reduced significantly.

The table of FIG. 5 presents a comparison between a conventional correlation and a correlation in accordance with the invention for an exemplary GPS C/A receiver. The GPS receiver uses a sampling rate of 2 MHz and converts each detected analog sample value into a digital value having a complex wordlength of 3 bits. It employs 8184 complex correlators. In the conventional receiver, 17 DFT bins are used, while in the receiver according to the invention, 1 DFT bin is used. The coherent integration length is 20 ms. The complex coherent memory wordlength is 8 bits. When assuming a double coherent integration length and 1 DFT bin, the number of DFT bins in the non-coherent integration not being limited, the combined coherent memory and sample memory is reduced with the invention from 272 kBytes to 75 kBytes.

Thus, it is shown that the sum of the coherent memory and the sample memory is reduced by more than 70% with the invention.

While it has been shown and described and pointed out fundamental novel features of the invention as applied to an embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method, comprising:
storing signal samples of at least one received code modulated signal with a first rate in a memory;
reading stored signal samples with a second rate from said memory, wherein said second rate is higher than said first rate;
compensating in said read signal samples various possible Doppler frequencies; and
determining for each of said possible Doppler frequencies a correlation between said compensated signal samples and samples of at least one available replica code.

2. The method of claim 1, further comprising determining correlations between compensated signal samples and different replica codes based on signal samples that are read from said memory various times.

3. The method of claim 2, wherein determining a correlation comprises a coherent integration, and wherein said memory stores samples for up to at least one integration period of said coherent integration.

4. The method of claim 3, wherein signal samples are only read from said memory when signal samples for at least one integration period of said coherent integration have been stored in said memory.

5. The method according to claim 2, wherein compensating in said read signal samples various possible Doppler frequencies comprises compensating in said read signal samples sequentially various possible Doppler frequencies and wherein determining for each of said possible Doppler frequencies a correlation between said compensated signal samples and samples of at least one available replica code comprises applying sequentially for each of said possible Doppler frequencies a matched filter operation to said compensated signal samples.

6. The method of claim 5, wherein results of said matched filter operation are further subjected to at least one of a coherent integration and a non-coherent integration.

7. An electronic device, comprising:
a memory component adapted to store signal samples of at least one received code modulated signal with a first rate;
a compensation component adapted to read signal samples stored in said memory with a second rate, said second rate being higher than said first rate, and to compensate in said read signal samples various possible Doppler frequencies; and
a correlation component adapted to determine for each of said possible Doppler frequencies a correlation between said compensated signal samples and samples of at least one available replica code.

8. The electronic device of claim 7, wherein a determination of a correlation by said correlation component includes a coherent integration, and wherein said memory component is adapted to store signal samples for up to at least one integration period of said coherent integration.

9. The electronic device of claim 8, wherein said correlation component is adapted to read signal samples from said memory component only when signal samples for at least one integration period of said coherent integration have been stored in said memory.

10. The electronic device of claim 7, wherein said memory component is a sample memory component.

11. The electronic device of claim 7, wherein said electronic device is a mobile terminal.

12. An apparatus, comprising:
a memory component configured to store with a first rate signal samples of at least one received code modulated signal;
a compensation component configured to read signal samples stored in said memory with a second rate, said second rate being higher than said first rate, and to compensate in said read signal samples various possible Doppler frequencies; and
a correlation component configured to determine for each of said possible Doppler frequencies a correlation between said compensated signal samples and samples of at least one available replica code.

13. The apparatus of claim 12, wherein a determination of a correlation by said correlation component includes a coherent integration, and wherein said memory component is configured to store signal samples for up to at least one integration period of said coherent integration.

14. The apparatus of claim 13, wherein said correlation component is configured to read signal samples from said memory component only when signal samples for at least one integration period of said coherent integration have been stored in said memory component.

15. The apparatus of claim 12, wherein said memory is a sample memory.

16. The apparatus of claim 12, wherein said apparatus is a chip for use in an electronic device.

17. A system including an electronic device and at least one network element of a communication network, said electronic device comprising:
a memory component adapted to store signal samples of at least one received code modulated signal at a first rate;
a compensation component adapted to read signal samples stored in said memory with a second rate, said second rate being higher than said first rate, and to compensate in said read signal samples various possible Doppler frequencies; and
a correlation component adapted to determine for each of said possible Doppler frequencies a correlation between said compensated signal samples and samples of at least one available replica code.

18. The system of claim 17, wherein a determination of a correlation by said correlation component includes a coherent integration, and wherein said memory component is adapted to store signal samples for up to at least one integration period of said coherent integration.

19. The system of claim 17, further comprising at least one beacon transmitting said at least one code modulated signal.

20. The system of claim 17, wherein said beacon is a satellite of a satellite based positioning system.

21. A computer program product comprising a computer readable storage medium embodying computer program code thereon for execution by a computer processor, wherein said program code includes instructions for:
causing signal samples of at least one received code modulated signal to be stored with a first rate in a memory component;
causing signal samples stored in said memory component to be read from said memory component with a second rate, wherein said second rate is higher than said first rate;
compensating in said read signal samples various possible Doppler frequencies; and
determining for each of said possible Doppler frequencies a correlation between said compensated signal samples and samples of at least one available replica code.

22. An apparatus comprising:
means for storing signal samples of at least one received code modulated signal with a first rate in a memory;
means for reading stored signal samples with a second rate from said memory, wherein said second rate is higher than said first rate;
means for compensating in said read signal samples various possible Doppler frequencies; and
means for determining for each of said possible Doppler frequencies a correlation between said compensated signal samples and samples of at least one available replica code.

* * * * *